(12) United States Patent
Savanth et al.

(10) Patent No.: US 11,862,067 B2
(45) Date of Patent: Jan. 2, 2024

(54) CIRCUITRY AND METHOD FOR CONTROLLING A GIVEN DISPLAY IMAGE TRANSITION FROM A CURRENT DISPLAY IMAGE TO A SECOND, DIFFERENT, DISPLAY IMAGE

(71) Applicant: Arm Limited, Cambridge (GB)

(72) Inventors: Parameshwarappa Anand Kumar Savanth, Cambridgeshire (GB); Jedrzej Kufel, Cambridgeshire (GB); Benoit Labbe, Cambridgeshire (GB); Sahan Sajeewa Hiniduma Udugama Gamage, Cambridgeshire (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/806,194

(22) Filed: Jun. 9, 2022

(65) Prior Publication Data
US 2022/0398970 A1 Dec. 15, 2022

(30) Foreign Application Priority Data
Jun. 10, 2021 (GB) ...................................... 2108307

(51) Int. Cl.
*G09G 3/20* (2006.01)
*H02S 40/38* (2014.01)
*H02S 50/00* (2014.01)

(52) U.S. Cl.
CPC ......... *G09G 3/2096* (2013.01); *G09G 3/2085* (2013.01); *H02S 40/38* (2014.12); *H02S 50/00* (2013.01)

(58) Field of Classification Search
CPC .. G09G 3/2096; G09G 3/2085; G09G 3/3659; G09G 3/288; G09G 3/3688;
(Continued)

(56) References Cited

U.S. PATENT DOCUMENTS

2002/0097002 A1\* 7/2002 Lai ....................... G09G 3/3266
315/169.3
2007/0052366 A1 3/2007 Chen et al.
(Continued)

FOREIGN PATENT DOCUMENTS

KR 10-2015-0120900 10/2015
KR 2015120900 A \* 10/2015 ............. G01G 23/36

OTHER PUBLICATIONS

Examination Report for GB Application No. 2108307.6 dated Jun. 28, 2023, 6 pages.

*Primary Examiner* — Richard J Hong
(74) *Attorney, Agent, or Firm* — NIXON & VANDERHYE P.C.

(57) ABSTRACT

Circuitry comprises driver circuitry to control display of a prevailing display image by display elements of a display device, the driver circuitry generating a signal providing electrical charge for storage by display elements, in which an electrical charge stored by a display element controls a display output of that display element; detector circuitry to detect, for a display image transition from a current display image to a second, display image, a first set of one or more display elements which are in a respective first state controlled by a first stored electrical charge in the current display image and which are required to be in a respective second state controlled by a second electrical charge, in the second display image; switching circuitry, responsive to the detector circuitry, to divert electrical charge from the set of display elements to secondary charge store in response to initiation of the display image transition.

18 Claims, 8 Drawing Sheets

(58) Field of Classification Search
CPC .... G09G 3/3266; G09G 3/3677; H02S 40/38; H02S 50/00; G01G 23/36; H10K 39/601
See application file for complete search history.

(56) References Cited

U.S. PATENT DOCUMENTS

| | | | | |
|---|---|---|---|---|
| 2007/0229485 | A1* | 10/2007 | Burr | G09G 3/2096 345/211 |
| 2008/0084371 | A1* | 4/2008 | Yang | G09G 3/3688 345/87 |
| 2009/0289933 | A1* | 11/2009 | Moriyama | G09G 3/288 345/213 |
| 2012/0219831 | A1* | 8/2012 | Mak | H10K 39/601 977/734 |
| 2016/0171947 | A1* | 6/2016 | Chen | G09G 3/3659 345/88 |
| 2016/0171948 | A1* | 6/2016 | Chen | G09G 3/3677 345/212 |

* cited by examiner

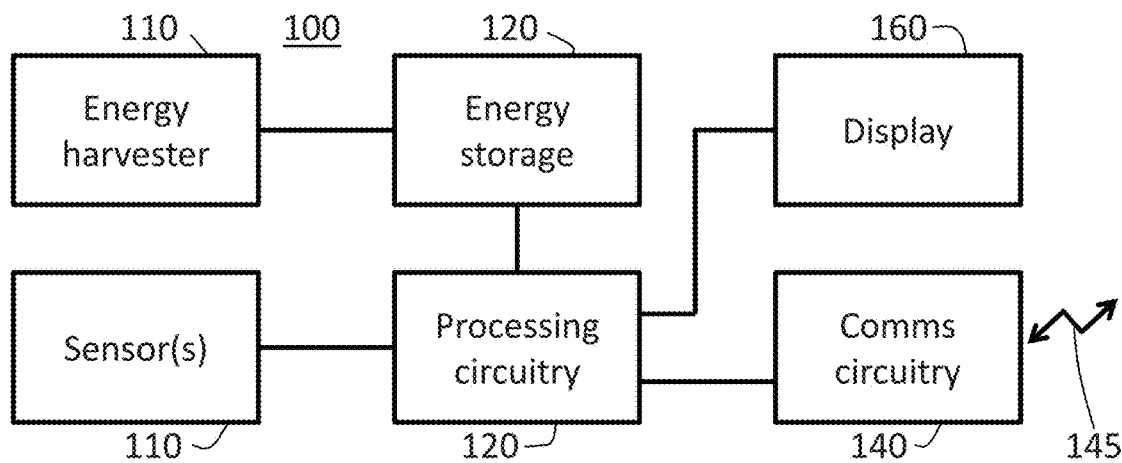
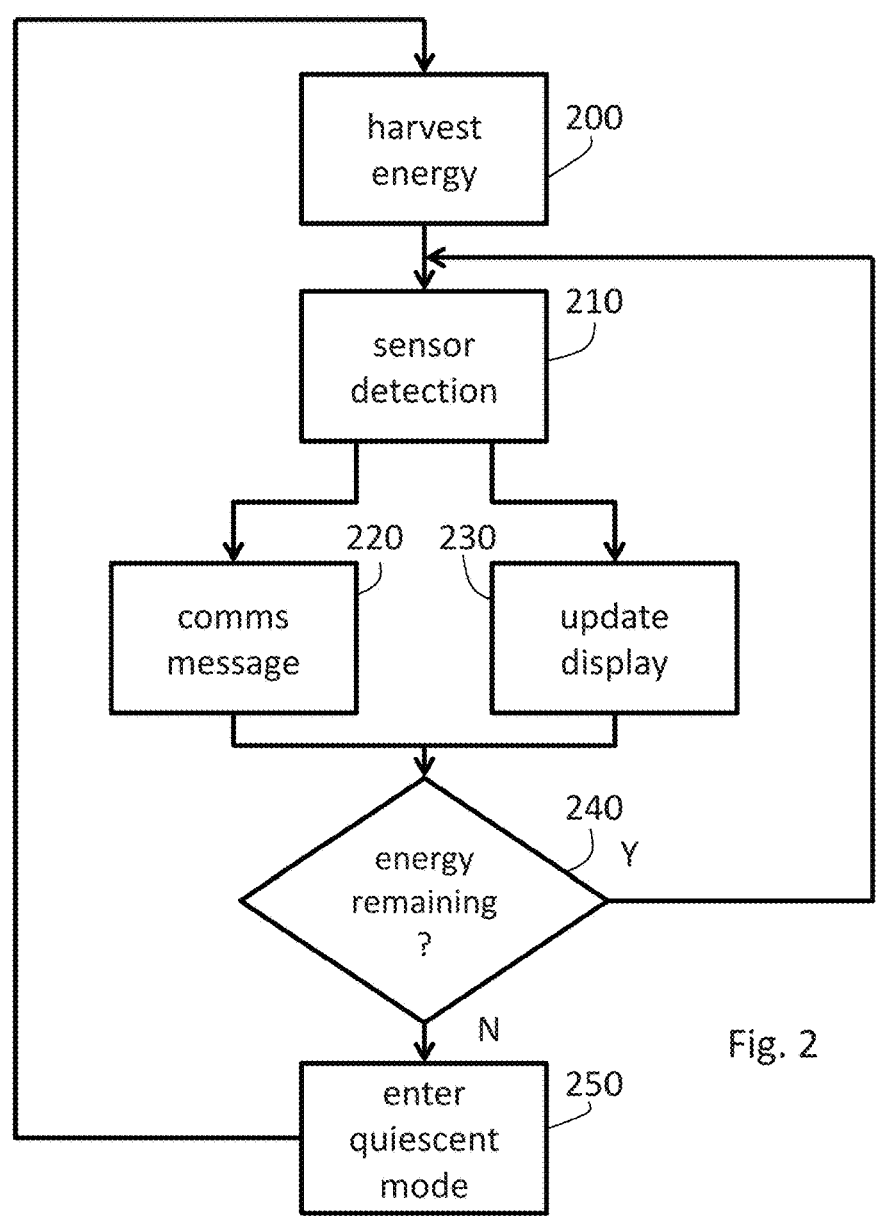

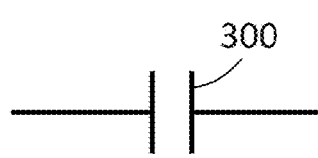
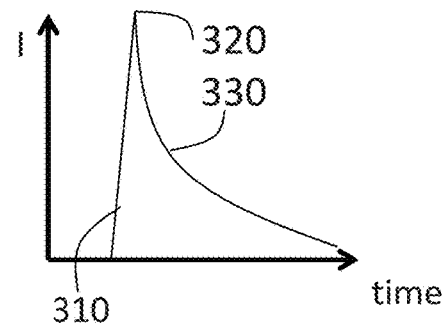
Fig. 3a
Fig. 3b
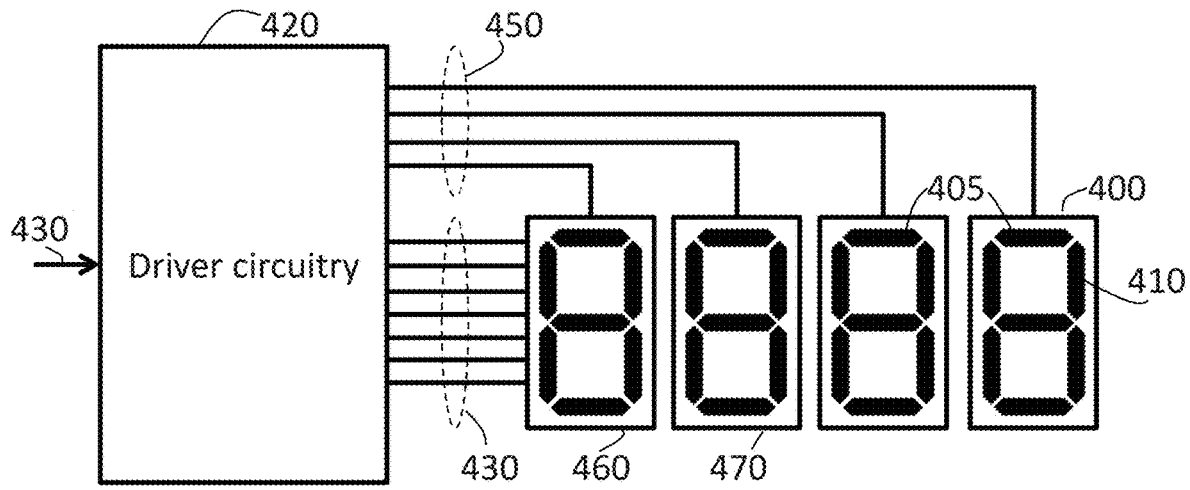
Fig. 4
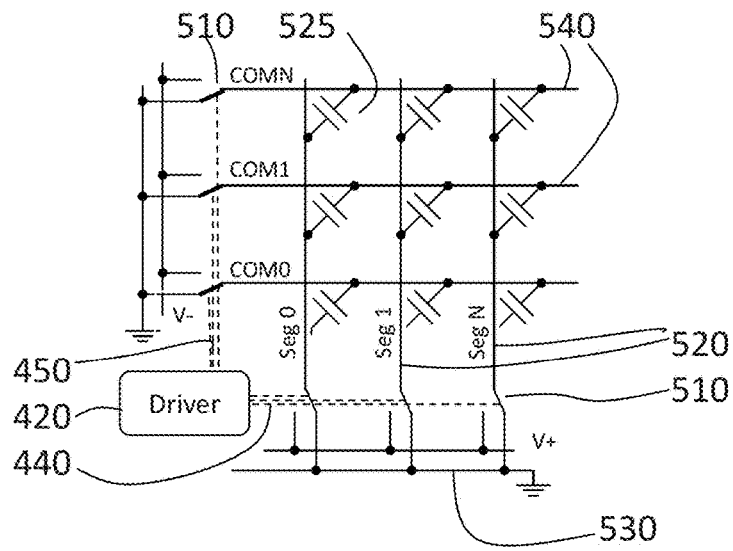
Fig. 5

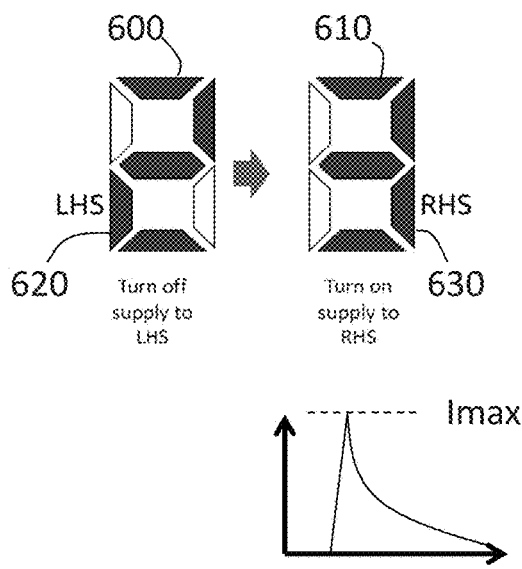
Fig. 6
Fig. 7
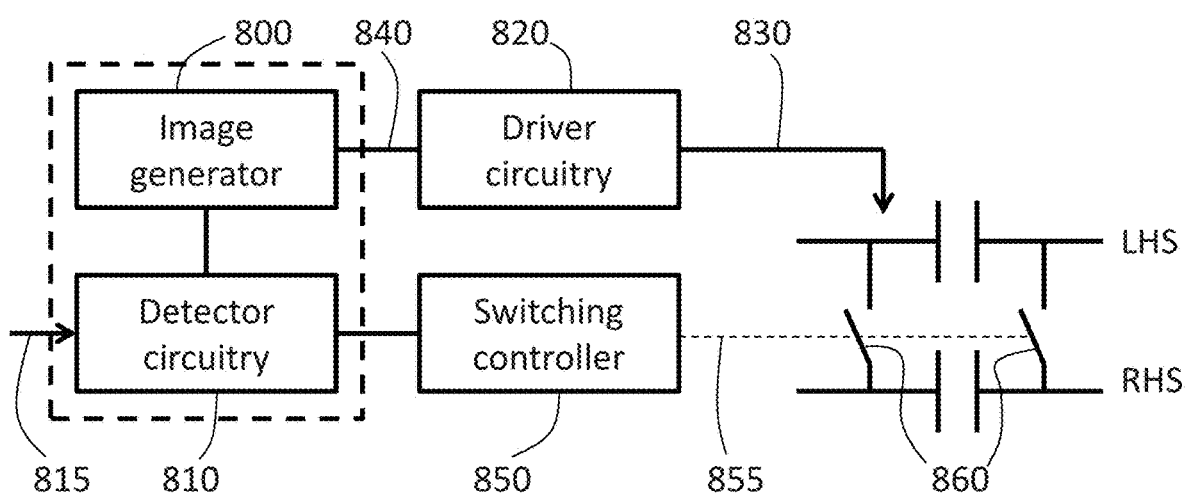
Fig. 8

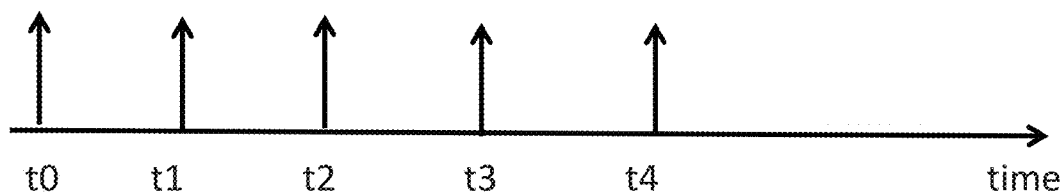
Fig. 11a
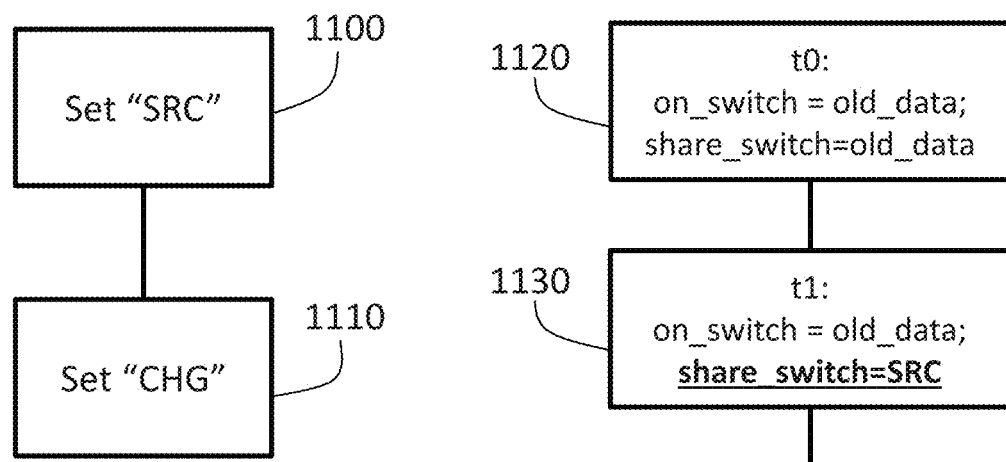
Fig. 11b
Fig. 11c
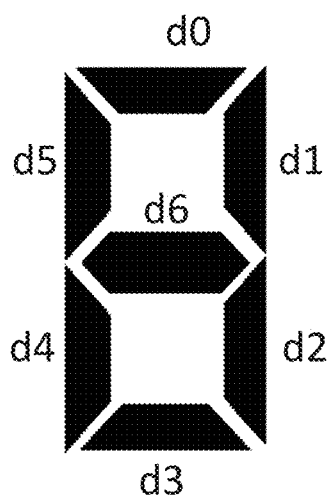
Fig. 11d
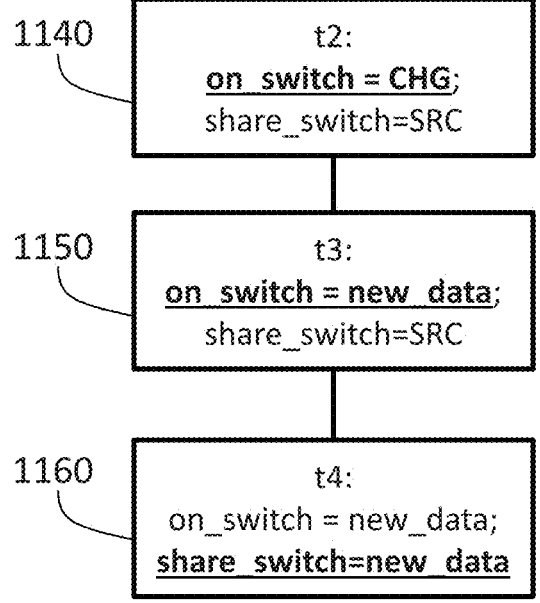

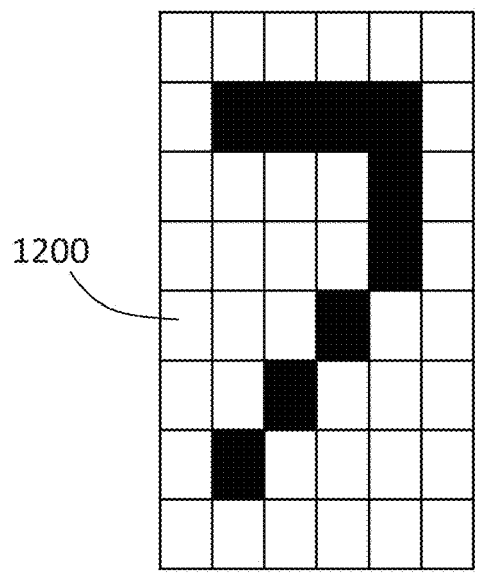
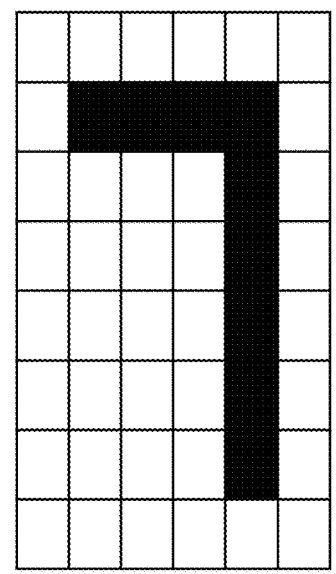
Fig. 12a  Fig. 12b
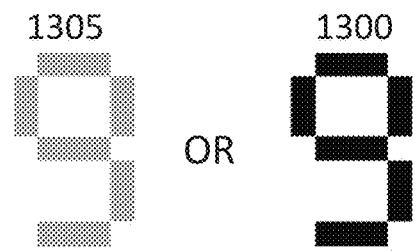
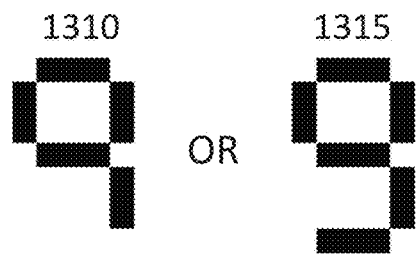
Fig. 13a  Fig. 13b
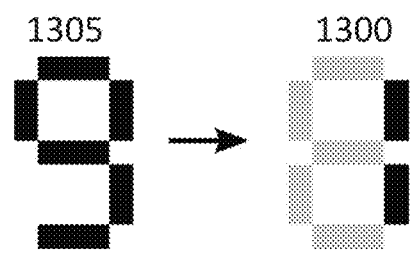
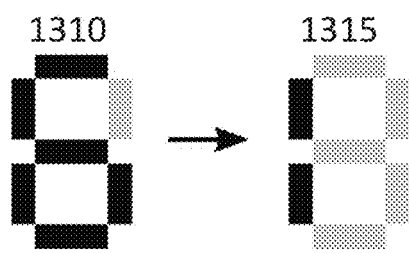
Fig. 14a  Fig. 14b
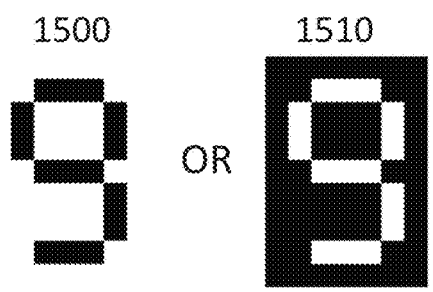
Fig. 15

CIRCUITRY AND METHOD FOR CONTROLLING A GIVEN DISPLAY IMAGE TRANSITION FROM A CURRENT DISPLAY IMAGE TO A SECOND, DIFFERENT, DISPLAY IMAGE

CROSS-REFERENCE TO RELATED APPLICATIONS

This application claims priority pursuant to 35 U.S.C. 119(a) to United Kingdom Patent Application No. 2108307.6, filed Jun. 10, 2021, which application is incorporated herein by reference in its entirety.

BACKGROUND

This disclosure relates to circuitry and methods. It is known to provide circuitry with display devices having multiple display elements which are capable of displaying an image (such as, for example, one or more alphanumeric characters) to a user. In some instances the display elements are arranged to store electrical charge, with the stored electrical charge controlling a display output of that display element.

SUMMARY

In an example arrangement there is provided circuitry comprising:
- driver circuitry to control display of a prevailing display image by display elements of a display device, the driver circuitry generating a signal providing electrical charge for storage by display elements, in which an electrical charge stored by a display element controls a display output of that display element;
- detector circuitry to detect, for a given display image transition from a current display image to a second, different, display image, a first set of one or more display elements which are in a respective first state controlled by a first stored electrical charge in the current display image and which are required to be in a respective second state controlled by a second stored electrical charge, lower than the first stored electrical charge, in the second display image; and
- switching circuitry, responsive to the detector circuitry, to divert electrical charge from display elements of the set of one or more display elements to a secondary charge store in response to initiation of the display image transition.

In another example arrangement there is provided a method comprising:
- controlling display of a prevailing display image by display elements of a display device, by generating a signal providing electrical charge for storage by display elements, in which an electrical charge stored by a display element controls a display output of that display element;
- detecting, for a given display image transition from a current display image to a second, different, display image, a first set of one or more display elements which are in a respective first state controlled by a first stored electrical charge in the current display image and which are required to be in a respective second state controlled by a second stored electrical charge, lower than the first stored electrical charge, in the second display image; and
- diverting, in response to the detection, electrical charge from display elements of the set of one or more display elements to a secondary charge store in response to initiation of the display image transition.

Further respective aspects and features of the present technology are defined by the appended claims.

BRIEF DESCRIPTION OF THE DRAWINGS

The present technique will be described further, by way of example only, with reference to embodiments thereof as illustrated in the accompanying drawings, in which:

FIG. 1 schematically illustrates example circuitry;

FIG. 2 is a schematic flowchart illustrating operations of the circuitry of FIG. 1;

FIG. 3a schematically illustrates a display element;

FIG. 3b schematically illustrates a display element charging curve;

FIG. 4 schematically illustrates a set of seven-segment displays driven by driver circuitry;

FIG. 5 is a schematic circuit diagram illustrating operations of the arrangement of FIG. 4;

FIG. 6 schematically illustrates a transition between the display of two different alphanumeric characters by a seven-segment display;

FIG. 7 schematically introduces a charge sharing operation;

FIG. 8 schematically illustrates example circuitry to perform a charge sharing operation;

FIG. 11a is a schematic timing chart;

FIGS. 11b and 11c are schematic flowcharts illustrating respective methods;

FIG. 11d schematically illustrates an example seven-segment display;

FIGS. 12a and 12b schematically illustrate the use of pixelated displays;

FIGS. 13a, 13b, 14a, 14b and 15 schematically illustrate the selection of candidate representations of alphanumeric characters;

DESCRIPTION OF EMBODIMENTS

Figure 9:
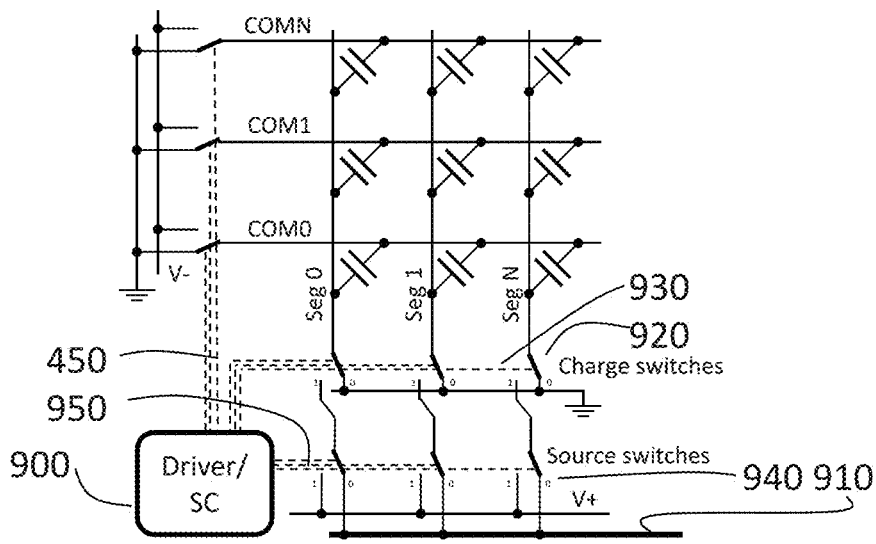
FIGS. 9 and 10 are respective schematic circuit diagrams illustrating variations of the circuitry of FIG. 8.

Referring now to the drawings, FIG. 1 schematically represents aspects of an example processing circuitry 100, for example embodying a so-called Internet of Things (IoT) device. Such devices are generally aimed at providing localised low-power low-cost processing capability relating to a particular task, often with a wireless Internet connection being provided.

In the example arrangement of FIG. 1, so-called energy "harvesting" is implemented by an energy harvester 110. This term refers to providing electrical energy for the operation of the circuitry 100 from one or more locally available sources, examples including solar, thermal, induction and/or mechanical energy sources. Therefore, the energy harvester 110 may comprise, for example, a solar electrical generator or converter, a thermal electrical generator, for example responsive to a temperature gradient across the energy harvester, induction circuitry to receive electrical energy from a complimentary apparatus placed nearby and/or a mechanical or vibrational electrical energy generator responsive to movement of the energy harvester 110. These are all just examples of energy harvesting techniques and any one or more of these or other similar techniques may be used. A common feature of energy harvesting arrangements is that the generated power can be relatively low and intermittent, which in turn implies that when that harvested energy is stored, for example by energy storage 120 (for example, capacitive and/or rechargeable battery storage), and used to power the circuitry 100, it is important that the power consumption of the circuitry, or at least the energy requirement to complete a particular task, is also low.

Therefore, in examples, the circuitry of FIG. 1 comprises energy harvesting apparatus to generate electrical energy to power at least some operations of the display apparatus (being any one or more parts of FIG. 1 including the display 160) in response to a current configuration or motion of the circuitry. The energy harvesting apparatus may comprise (i) solar generation apparatus; (ii) apparatus to generate electrical energy in response to physical motion of the energy harvesting apparatus; (iii) apparatus to generate electrical energy in response to a temperature of the energy harvesting apparatus; and/or (iv) induction apparatus to generate electrical energy in response to presence of the energy harvesting apparatus within a given electrical and/or magnetic field.

Of course, IoT devices do not have to use energy harvesting and in some examples they can be powered by dry cell sources or rechargeable cell sources. Once again though, in order to avoid having to replace those dry cell sources (or recharge the rechargeable cell sources) too often, low-power consumption is also an advantage in this situation.

It is also noted that the present techniques (to be described below) apply not only to IoT devices of the type described above, but to any processing circuitry incorporating a display device, whether or not the processing circuitry performs communication (by the Internet or otherwise) and whether or not the processing circuitry incorporates one or more sensors. The present techniques are particularly applicable where power consumption is an issue, for example in an energy harvesting situation or in the context of a small capacity dry cell or rechargeable power supply. However, the present techniques are not limited to any specific application of this type and it is noted that the environmental benefit of reducing power consumption of electronic circuitry is a constant aim in many fields of electronic technology.

A typical IoT device performs some sort of processing operation, and in the example of FIG. 1 processing circuitry 130 is provided for this purpose. Similarly, an IoT device generally performs communication via the Internet and to this end communication ("Comms") circuitry 140 is provided to allow a wireless link 145 with an access point or a base station (not shown).

Depending on the functionality required of the circuitry 100, one or more sensor(s) 150 may provide input to the processing circuitry 130 and a display 160 may allow for the display of information generated by the processing circuitry 130.

It is noted that the harvesting of energy by the energy harvester 110 can be intermittent and also may or may not coincide with occasions at which processing is required by the processing circuitry 130. Therefore, harvested energy can be stored by the energy storage 120 and used by the remainder of the circuitry under the control of the processing circuitry 130, for example at predetermined intervals, in response to an interrupt or other indication provided by ongoing quietened operation of the sensor(s) 150, in response to a detection that the energy storage 120 currently holds enough energy to complete a particular set of operational tasks or the like.

FIG. 2 is a schematic flowchart illustrating one example of this type of operation, in which at a step 200, energy is harvested by the energy harvester 110. At a step 210 a sensor detection is made by the sensor(s) 150 and in response to that detection, one or both of a communications message is sent (at a step 220) by the communications circuitry 140 and a display image or state displayed by the display 160 is updated at a step 230. If, at a step 240, sufficient energy remains in the energy storage to repeat these operations, control may return to the step 210 (either straightaway or after a defined period, for example). If not then control passes to a step 250 which the circuitry enters a quiescent mode and the harvesting of energy at the step 200 continues.

The display 116, in this example, makes use of a set of display elements which are each activated by controlling the storage of electrical charge by that display element. Accordingly, an individual display element may be considered as a capacitor such as that shown as a capacitor 300 in FIG. 3a. Control circuitry to be described below can connect the capacitor 300 to a current source so that a charging operation may be described by the schematic current flow profile of FIG. 3b, in which time is represented on a horizontal axis and current (I) on a vertical axis. In this schematic representation, current rises 310 to a peak 320 before then decaying 330 in response to increasing charge storage by the capacitor 300.

The display elements may represent pixels or, in other examples such as that shown schematically in FIG. 4, segments 410 of so-called seven-segment displays 400. Here, in a previously proposed arrangement provided to illustrate some of the underlying techniques relating to examples of the present disclosure, four such seven-segment displays are illustrated schematically and are controlled by driver circuitry 420 responsive to data 430 indicative of alphanumeric characters to be displayed by the seven-segment displays 400. The driver circuitry provides a set of seven control signals 440 each applicable to a respective one of the segments and (in this example) a set of four control signals 450 each applicable to a respective one of the seven-segment displays 400. The control signals 440 and 450 control respective switches connecting a segment to a current source (not shown in FIG. 4) so that between the control signals 440 and the control signals 450, any individual segment of any individual seven-segment display can be addressed and connected to the current source.

The activation of a display element or segment in this example is such that the display element retains the stored charge at least for a period which is significantly longer than the time taken to charge that display element by the example profile of FIG. 3b. So, it is possible for the driver circuitry 420 to address each of the display elements which requires activation in turn so as to generate an overall set of activated display elements for a user to view.

Note that the "activation" of a display element can involve the display element changing brightness, colour or both so as to enable a user to perceive a difference between activated display elements and not-activated display elements.

In order to deactivate an already-activated display element, that display element can be shorted to ground, again under the control of the driver circuitry 420 and the control signals 440, 450, so as to discharge the stored charge held by that display element.

Therefore in these examples, the driver circuitry 420 operates as driver circuitry to control display of a prevailing display image by display elements 410 of a display device (in this example, the set of seven-segment displays 400 or indeed any individual one of the seven-segment displays), the driver circuitry generating a signal providing electrical charge for storage by display elements, in which an electrical charge stored by a display element controls a display output of that display element.

These basic aspects of operation are illustrated by a schematic circuit diagram of FIG. 5 incorporating the driver circuitry 420 and a power source (represented schematically by V+ and V− supply terminals). The control signals 440 control a set of switches 510 to connect segment lines 520 either to the power source or to ground 530. The segment lines 520 relates to an individual segment 410 in each of the seven-segment displays 400; for example, "Seg 0" may relate to the uppermost segment 405 of each of the seven-segment displays, with the display element represented by a capacitor symbol 525 connected between that segment line and a "common" line 540 which is common to the entire seven-segment display 400. So, for example, the common line 540 "COM 0" might relate to a left-most seven-segment display 460; the common line "COM 1" might relate to a second-leftmost seven-segment display 470 and so on. Under the control of the signals 450 the common lines can individually be grounded, connected to the power supply or tri-stated (effectively, isolated or connected to neither) by other respective switches 510. Therefore, using this arrangement, an appropriate combination of the control signals 440, 450 can ground any individual display element or connect any individual display element to the power source. In this way, as discussed above, any individual display element can be activated (by being caused to store a charge) or deactivated (by being grounded so as to discharge any stored charge).

FIGS. 6 and 7 schematically represent an example of a technique applicable to embodiments of the disclosure, in which stored charge is shared as between one or more display elements to be deactivated and one or more display elements to be newly activated.

As background, in an IoT or similar device of the type discussed above, the amount of electrical energy available to perform a given processing and display task may be heavily limited, for example by the limitations of an energy harvesting arrangement in use. Example embodiments recognise this and also recognise that simply discharging a display element to ground is potentially wasteful of the charge that was used in order to initially activate that display element.

Referring to FIG. 6, a seven-segment display is illustrated in an initial state 600 (displaying a representation of the numeral 2) and a subsequent state 610 (displaying a representation of the numeral 3). In order to transition between the initial state 600 and the subsequent state 610, many of the individual segments of the seven-segment display remain unchanged, but it is noted that one segment 620 (labelled as "LHS") has to be deactivated and another segment 630 (labelled as "RHS") has to be activated.

The deactivation of the LHS segment 620 is performed in FIG. 6 by simply grounding the segment. At the lower portion of FIG. 6 is shown a schematic charging curve illustrating the current flow in charging the RHS segment 630 from a completely grounded initial state. Here a peak current $I_{max}$ is required to perform the charging operation.

Turning to FIG. 7, the same initial 600 and final 610 states are shown, but in between them an intermediate state 700 is illustrated in which the one or more display elements to be deactivated (in this case the element 620) are connected not initially to ground but to the one or more display elements to be activated (in this case the element 630). This provides for a so-called charge sharing between the one or more display elements to be deactivated and the one or more display elements to be activated. In principle at least, the amount of charge stored by the display element 620 will reduce to 50% and a pre-charge of the display element 630 will provide 50% of the required charge to activate the display element 630. These ratios referred to the specific example of FIGS. 6 and 7 in which the number of display elements to be deactivated is equal to the number of display elements to be activated. If these numbers are different, the amount of pre-charging of the display element(s) to be activated may be different to 50%. These ratios also refer to a notionally perfect or lossless discharging and pre-charging operation and such perfect efficiency may not be obtained in an empirical example, but nevertheless at least some pre-charging of the one or more display elements to be activated can be achieved by using charge previously stored by the one or more display elements to be deactivated.

The intermediate state 700 is maintained for a predetermined or minimum time period to allow charge flow between the respective display elements and then the charge sharing display elements are isolated from one another so as to leave the one or more elements to be activated holding an amount of pre-charge. The one or more display elements to be deactivated may then be disconnected from the charge sharing arrangement and grounded, and the power supply connected to the one or more display elements to be newly activated so as to complete the charging and activation of those one or more display elements.

Significantly, however, with reference to the schematic graph drawn as a lower portion of FIG. 7, the pre-charging of the RHS element 630 has the result that less charge has to be drawn from the power supply in order to complete the charging of the RHS element 630. In the schematic graph this is illustrated by a peak charging current $I_{red}$ being somewhat lower than the peak charging current $I_{max}$ required in the comparative example of FIG. 6.

Note that the energy cost of controlling the relevant switches to earth the display element(s) to be deactivated is the same as between FIG. 6 and FIG. 7. Similarly, the energy cost of controlling the relevant switches to connect the power supply to the display element(s) to be activated is also the same as between FIG. 6 and FIG. 7. There is an additional switching operation in FIG. 7 to connect and then disconnect the display elements which are to undergo charge sharing, but in comparison to the energy saving through the charge sharing operation, this energy costs in performing the switching is considered negligible. Therefore, using these techniques, the charge sharing arrangement shown schematically in FIG. 7 can contribute to a net energy saving (with respect to the previously proposed arrangement of FIG. 6) when a display device is transitioned between a first display state and a second, different, display state.

Although the example of FIGS. 6 and 7 has been with respect to seven-segment displays, the same techniques and underlying potential benefits may apply in respect of other types of displays having multiple display elements, for example pixelated displays.

FIG. 8 provides a schematic overview of circuitry capable of performing the operations of FIG. 7. This can operate in respect of various different display devices as discussed above but in some examples the display device comprises one or more alphanumeric character displays such as seven-segment displays. For the sake of simplicity of the diagram of FIG. 8, only the LHS 620 and RHS 630 display elements of a particular example seven-segment display are illustrated (being shown by a schematic capacitor symbols).

Note that the circuitry of FIG. 8 may be implemented without the presence of a display device, in the form of circuitry for connection to a display device, or may incorporate the display device as well.

Image generator circuitry 800 (to generate a display image for display by the display device) and detector circuitry 810 may be implemented by, for example, the processing circuitry 130 of FIG. 1, for example a CPU or other processing element. Driver circuitry 820 corresponds to the driver circuitry 420 of FIG. 4 so as to generate control signals 830 (corresponding schematically to the control signals 440, 450) in response to data 840 (corresponding to the information 430) defining a required display configuration or state to be displayed.

The detector circuitry 810 is configured to detect, for a given display image transition from a current display image to a second, different, display image, a first set of one or more display elements which are in a respective first state controlled by a first stored electrical charge in the current display image and which are required to be in a respective second state controlled by a second stored electrical charge, lower than the first stored electrical charge, in the second display image. With reference to the example of FIG. 7, the first set of one or more display elements is represented by the LHS element 620. In the current display image represented by the display state 600, these are in a first (activated) state and in the second display image represented by the display state 610, these are in a second state (deactivated) controlled by a (lower) second stored electrical charge. In other words, the detected or identified first display element(s) are elements which are to be deactivated or at least reduced in terms of their stored charge between the current display image and the second (for example subsequent) display image.

Switching circuitry, comprising a switching controller 850 and one or more switches 860 is responsive to the detector circuitry, to divert electrical charge from display elements of the set of one or more display elements to a secondary charge store in response to initiation of the display image transition. The switching controller 850 controls the switches 860 by schematic control signals 855.

In the example of FIGS. 7 and 8, the secondary charge store referred to above is represented by the so-called RHS element 630. Other examples will be described below in which charges diverted to a different type of secondary charge store, but in the context of these first examples, the detector circuitry 810 is configured to detect, for the given display image transition, a second set of one or more display elements which are in a respective second state controlled by a second stored electrical charge in the current display image and which are required to be in a respective first state controlled by a first stored electrical charge, greater than the second stored electrical charge, in the second display image. In other words, the second set of one or more display elements corresponds to display elements to be newly activated, or at least ones which are to have their stored charge increased by the given display image transition. In the example of FIG. 7, this corresponds to the RHS element 630, as an example of the secondary charge store comprising one or more of the second set of one or more display elements.

Therefore, in the example of FIG. 8, the control signals 830 control the charging and discharging of display elements to be activated and deactivated. In other words the driver circuitry is configured to generate the signal in respect of a display element to provide a required total stored electrical charge dependent upon a required display output of that display element. In examples, for example as discussed with reference to the reduced peak current $I_{red}$ of FIG. 7, for a given display element of the second set of one or more display elements, the driver circuitry is configured to generate the signal in respect of the given display element to provide the required total stored electrical charge taking into account electrical charge diverted to the given display element by the switching circuitry.

The given display image transition may comprise, for example, a transition from a current display of a current set of one or more alphanumeric characters to a display of a second, different, set of alphanumeric characters.

The switching controller 850 controlling operation of the switches 860 controls the selective shorting together or connecting together (for the purposes of charge sharing) of display elements identified in respect of a given display image transition by the detector circuitry. In example arrangements this charge sharing applies only to display elements identified in respect of a given display image transition by the detector circuitry.

Example Circuitry

Figure 10:
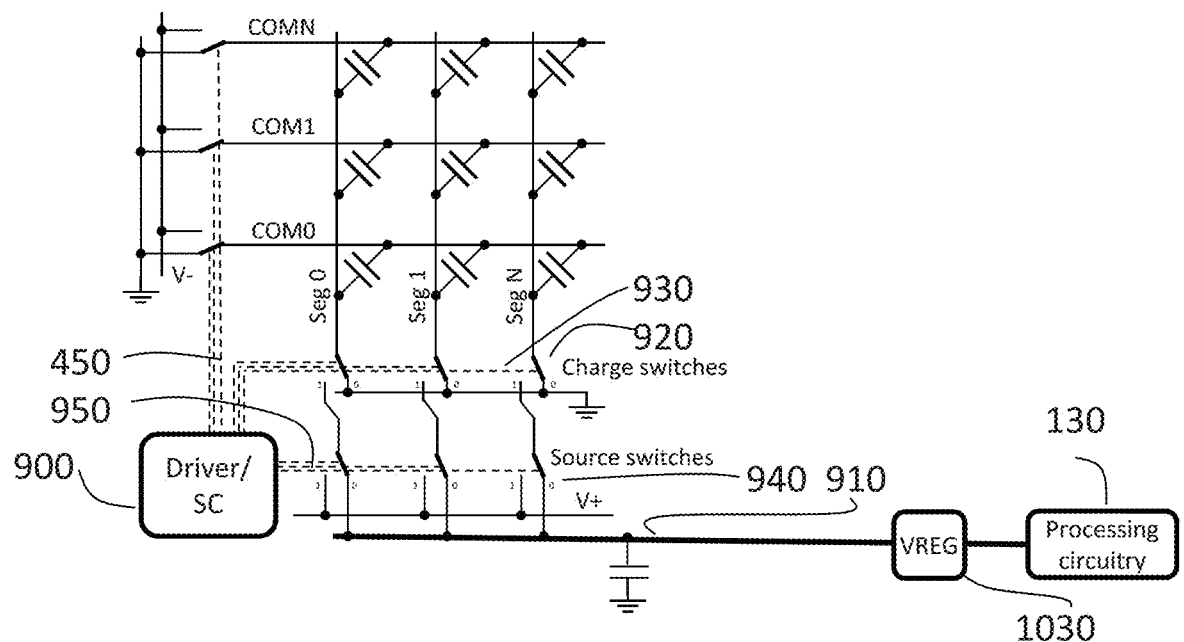

Referring now to FIGS. 9 and 10, example circuitries are provided which are similar in some respects to that of FIG. 5 but which also embody the functionality of the switches 510 of FIG. 5 and the switches 860 of FIG. 8 by source switches 940 under the control of control signals 950 and charge switches 920 under the control of control signals 930. In the schematic representation of FIG. 9, a single schematic circuitry 900 represents the functionality of the driver circuitry 820 and the switching controller 850.

The switch operation is as follows. When charge switch=0 the relevant charge switch 920 is connected to ground. When charge switch=1 the relevant charge switch is connected to the respective source switch 940. When source switch=1, the respective source switch is connected to the power supply. When source switch=0, the respective source switch is connected to a bus 910 so as to provide a function of selectively connecting together groups of segments identified by the detector circuitry 810 (not shown in FIG. 9) for the purposes of selective and temporary charge sharing.

Therefore, in order to charge a segment from the power supply, charge switch=source switch=1. In order to ground a segment, charge switch=0. In order to share charge, charge switch=1 and source switch=0.

Referring to FIG. 10, features in common with FIG. 9 will not be described again but a substantive difference is the presence of an energy storage device such as a capacitor 1000 between the bus 910 and ground. Also connected across the capacitor 1000 is an optional voltage regulator 1030 which in turn supplies power to the processing circuitry 130 for example.

In this example, when a display element is to be deactivated or at least reduced in terms of its stored charge, that stored charge may be diverted by the switches 920, 940 to the bus 910 which has the effect of charging the capacitor 1000 rather than (or in addition to) one or more other display elements. This can provide a reserve of energy for use in powering aspects of the overall circuitry of FIG. 1, such as the processing circuitry 130.

The selection of whether to route charge held by an element to be deactivated into another display element, into the capacitor 1000 or into both can be made by the detector circuitry 810, for example in response to a control signal 815 indicative of one or more of (a) a current output of the energy harvester 110; (b) a prevailing amount of energy stored by the energy storage 120; and (c) a prediction of processing tasks to be performed next by the processing circuitry 130. When the detector circuitry 810 detects that more energy is required then is either already available or is likely to be available via energy harvesting, the detector circuitry 810 may route stored charge from one or more display elements to be deactivated at least in part into the capacitor 1000 to provide further electrical energy by which to operate the processing circuitry 130 or other parts of the circuitry of FIG. 1. Similarly, this also implies that if a display device is being entirely deactivated such that no display elements remain activated (or substantially fewer than were previously activated) then a waste of stored charge can be avoided by instead providing that stores charge to the capacitor 1000.

When the detector circuitry 810 detects that there is sufficient energy already stored by the energy storage 120 and/or the rate of energy harvesting implies that sufficient energy will be available to conduct a next processing operation, the stored charge can simply be routed (for example by suitable switches) to one or more other display elements.

In other examples, stores charge can always be provided to the capacitor 1000 to supplement the energy storage 120. The capacitor 1000 and the energy storage 120 may in fact be represented by the same set of energy storage components.

In this way, the capacitor 1000 provides an example of the secondary charge store comprising a charge store configured to provide electrical energy to power at least some operations of the overall apparatus.

FIGS. 11a-11c provide a timing diagram (FIG. 11a) and two schematic flowcharts (FIGS. 11b and 11c) to illustrate various timing considerations. FIG. 11d relates to a worked example to be described below.

Referring first to FIG. 11a, a sequence of time points t0 . . . t4 is shown. The time point t0 represents a time at which the current or initial image is displayed by a particular display element and the time point t4 represents a time at which the next or subsequent image is displayed by that display element. The intervening time points t1 . . . t3 will be described below and relates to stages in an example charge sharing process. Note that the time period between t0 and t4 may be of the order of (say) a few milliseconds, but it may vary according to design parameters in dependence upon (amongst other potential influences) the capacitance of each display element and the RC time constant of the circuitry including the display element, defining in turn a characteristic charge or discharge time for that display element.

FIG. 11b provides a schematic flowchart relating to initialisation steps performed in respect of a given image transition. The steps are performed for each display element and involves setting two variables for that display element and that image transition, namely "SRC" (at a step 1100) and "CHG" (at a step 1110). These are set as follows:
SRC=AND (old_data, new_data)
CHG=OR(old_data, new_data)

Here, "old_data" represents the state of the display element in the current image (for example, a 1 at a given bit position indicating an activated element) and "new_data" represents the state of the display element in the next or subsequent image following the given image transition.

Note that the switches 920, 940 are controlled on a bit by bit basis as discussed earlier in connection with FIGS. 9 and 10.

The time points t0 to t4 are represented by respective flowchart steps 1120 . . . 1160 and operations are performed as shown below. Here, "source_switch" relates to the state of the switch(es) 940 relevant to the display element under consideration. Also as mentioned above the variable "charge_switch" relates to the state of the switch(es) 920 relevant to the display element under consideration.

t0 (step 1120): source_switch=charge_switch=old_data
t1 (step 1130): source_switch=SRC; charge_switch=old_data
t2 (step 1140): source_switch=SRC; charge_switch=CHG
t3 (step 1150): source_switch=SRC; charge_switch=new_data
t4 (step 1160): source_switch=charge_switch=new_data This arrangement conveniently provides for only one of the two switches being changed at any one time (in FIG. 11c, the switch which is changing state is indicated by bold and underlined text). The window in which charge sharing actually takes place in this example is between t2 and t3.

In one example, using four bit values for old_data and new_data, consider the example in which old_data=1100 and new_data=0110. Here, SRC=0100 and CHG=1110. This leads to the following actions:

t0 (step 1120): source_switch=charge_switch=1100
t1 (step 1130): source_switch=0100; charge_switch=1100
t2 (step 1140): source_switch=0100; charge_switch=1110
t3 (step 1150): source_switch=0100; charge_switch=0110
t4 (step 1160): source_switch=charge_switch=0110

Referring now to another example seven-segment display as illustrated in FIG. 11d, each segment is controlled by a respective bit of a control value, with the segments d0-d6 being controlled by old_data or new_data bits 0 to 6 respectively.

Consider a further example in which the display is being changed from displaying a value 3 to a value 4.

At the start of the process (t0) old_data (d7:0) will be 0x4F (binary 1001111) so that the number 3 is displayed. The value new_data, in order to define a displayed number 4, is 0x66 (binary 1100110).

To derive "SRC" and "CHG":
SRC=AND (old_data, new_data)
=AND (0x4F, 0x66)
=0x46 (binary 1000110)
CHG=OR(old_data, new_data)=OR(0x4F, 0x66)
=0x6F (binary 1101111)

In some example arrangements, there can be multiple different ways of representing a required alphanumeric character and in the context of the techniques discussed above; a selection between these can provide various useful attributes relating to energy and charge management.

As an alternative to a seven-segment display, FIG. 12 schematically illustrates an example pixelated display by which a display image can be represented by changing the state of pixels 1200 each of which operates in the same manner as a display element discussed above. In the example of FIG. 12, display elements can be set to an activated state (drawn as black) or a deactivated state (drawn as white), although in other examples different colours or different greyscale options may be provided. It will be appreciated that one example representation of the numeral 7 is shown in FIG. 12a, but by activation of different pixels other representations such as that shown in FIG. 12b could be provided and which will be readily understood by a user to represent the same numeral character.

Similarly, with reference to FIGS. 13a and 13b, the numeral 9 could be displayed as a representation 1300 or as a representation 1310, either of which would be readily understood by a user.

This then provides for a selection by, for example, the image generator circuitry 800 operating in collaboration with the detector circuitry 810 of a form of representation of a required alphanumeric character (of the "second set" relating to the next or subsequent image to be displayed), the image generator circuitry selecting the representation from two or more candidate representations in response to an amount of electrical energy currently available for use by the apparatus.

For example, it may be possible to select a next representation which requires fewer display elements to transition from deactivated to activated or indeed from activated to deactivated than another potential representation, thereby potentially saving some energy which will otherwise be used or lost as part of the display elements transitions. In this way, the image generator circuitry may be configured to select the representation from the two or more candidate representations in response to a quantity of display elements in a different state as between the current display image and each of the candidate representations. For example, to save power the image generator circuitry may be configured to select a representation from the two or more candidate representations having a lowest quantity of display elements in a different state as between the current display image and the selected representation. In other examples, if there is currently a large amount of stored energy available, it may be appropriate to elect to store some of this in the display, for example by the image generator circuitry being configured to select a representation from the two or more candidate representations having a highest quantity of display elements in a different state as between the current display image and the selected representation.

In other examples, the display elements themselves can be used as supplementary charge storage so as to provide additional stored energy over and above that held by the energy storage 120 and/or the capacitor 1000. This stored energy can be liberated for use by the processing circuitry via the mechanism described above with reference to FIG. 10. In such arrangements the image generator circuitry may be configured to select a representation from the two or more candidate representations in dependence upon a quantity of display elements required to be in the first state in the selected representation.

In any of these cases, the assessment of which representation to use can take into account optional variations in state for the display elements. For example, representations may be in different display colours (for a colour display) or different monochrome intensities. So the choice between representations can be not only as between a first and a second representation which make use of different display elements but also between representations with different colours or intensities or the like.

Various examples will be described now with reference to FIGS. 13*a* to 15.

In the example of FIG. 13*a*, a pair of candidate representations of the numeral 9 is shown, in which a representation 1305 has a lower intensity than a representation 1300. In the present examples, a lower intensity is representative of a lower stored charge by the relevant display elements so that the lower intensity representation may be used in the context of a detection of a lower quantity of energy stored or available via the energy harvester 120 for use by the circuitry.

In the example of FIG. 13*b*, different forms of representation 1310, 1315 of the example numeral 9 are provided, each of which is readily understandable by a user. Selection between them can be in response to how many of the display elements need to transition in order to arrive at one of the representations or by virtue of the fact that the representation 1310 has fewer activated display elements than the representation 1315.

FIGS. 14*a* and 14*b* relates to display transitions between a representation of a first alphanumeric character "9" 1400 (FIG. 14*a*) or "6" 1410 (FIG. 14*b*) into a representation of the alphanumeric character "1" 1420, 1430. Either of the candidate representations 1420, 1430 is readily understandable by a user as the required alphanumeric character "1" but the selection between them is made by the image generator circuitry, optionally in collaboration with the detector circuitry, in response to reducing the number of display elements which leads to perform a transition, and in particular those display elements which need to perform a transition from a deactivated (or less activated) state to an activated (or more activated) state. In each of FIGS. 14*a* and 14*b*, the selection of the respective representation 1420, 1430 results in no display elements having to perform a transition from deactivated to activated.

In FIG. 15, again a pair of equally readable representations 1500, 1510 are provided of the alphanumeric character "9" but, in the context of a pixelated display such as that shown in FIGS. 12*a* and 12*b*, the number of activated pixels differs between the two representations, so that, for example, a readable representation 1510 can be provided which provides greater charge storage than another readable representation 1500.

Figure 16:
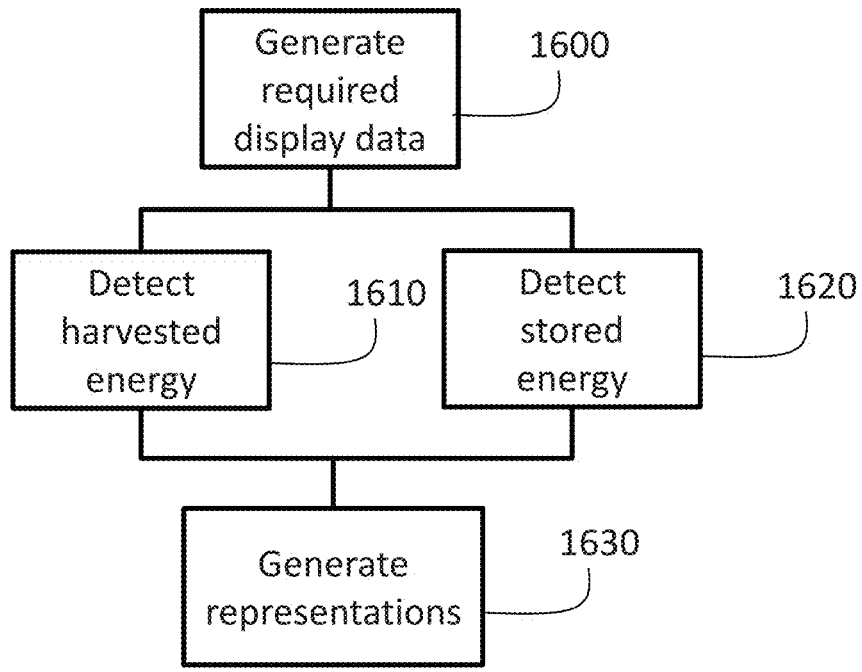
FIG. 16 is a schematic flowchart illustrating a method.

FIG. 16 provides a schematic representation in the form of a flowchart of this type of technique in which, at a step 1600, the image generator circuitry generates the required display data (for example, an alphanumeric character "9"). Operating potentially in collaboration with the detector circuitry, a detection is made of the currently harvested energy at a step 1610 and/or of the currently stored energy at a step 1620, so that at a step 1630 the image generator circuitry generates a representation of the required display data from two or more candidate representations according to the techniques described above, which is to say in order to provide energy storage in the case of potentially surplus energy and/or in order to provide reduced energy consumption by reducing display element transitions in the case of a potential shortfall of energy.

The various switches 510, 920, 940 may be configured to allow for different permutations of charging, discharging or charge-sharing amongst the display elements. For example, display elements can be charged from the power supply monitor time or in parallel. For charge sharing either with other display elements or with the capacitor 1000, display elements can be connected in series, for example to provide a higher voltage which might be required to run some or all operations of the processing circuitry 130 such as memory access or wireless operations, and/or to provide for a net flow of charge to another already partially charged display element or capacitor.

Figure 17:
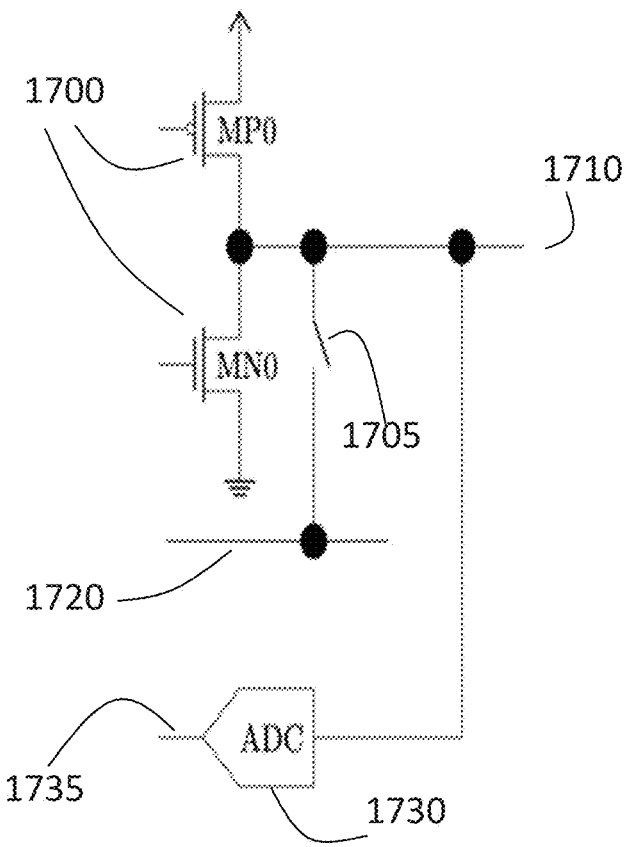
FIG. 17 schematically illustrates the use of detection circuitry.
Figure 18:
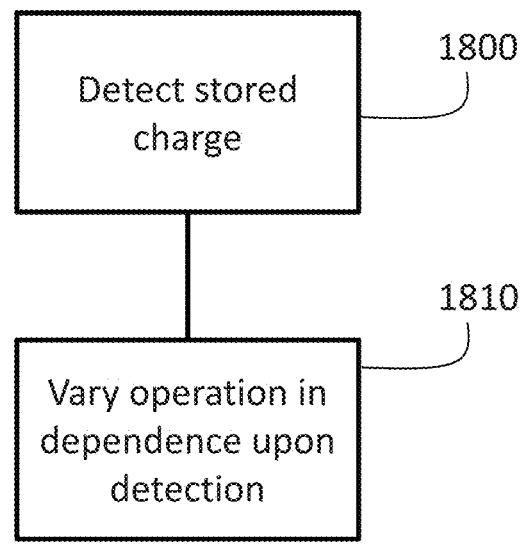
FIGS. 18 and 19 are schematic flowcharts illustrating respective methods.

As a possible additional technique for use with any of the techniques described above, FIG. 17 schematically illustrates the use of detection circuitry. Here, a part of the circuitry relating to one display element is represented schematically. Transistors 1700 provide the switching 510 relating to the common rail applicable to the display element. The display element itself is connected to a terminal 1710. A schematic switch 1705 connected to a bus or rail 1720 represents example functionality of the switch 920. A further feature in FIG. 17, however, is an analogue-to-digital converter (ADC) 1730 or other detection circuitry configured to sample the prevailing charge level at the display element (for example, by sampling the voltage across that display element which, for a particular capacitance value, is indicative of the stored charge) and providing an output 1735 indicative of the prevailing charge level to the driver circuitry 820 and/or switching controller 850. FIG. 18 is a schematic flowchart indicative of how this information may be handled.

At a step 1800, the stored charge for a display element is detected using, for example, the ADC 1730. At a step 1810, the operations described above may potentially be varied in dependence upon the detection.

Examples of such variation may include one or more of the following:

If the remaining charge in a display element is less than the energy cost to turn on a switch for charge-sharing then the switching controller 850 may elect not to turn on the switch and not to perform charge sharing at that time.

If different display elements have varying levels of charge then the switching controller 850 may prioritize operations by sharing first (or only) from the ones with highest energy difference between current and next states.

Further, the detected amount of charge can be used as part of the process to elect whether to divert stored charge to the capacitor 1000 for use in powering the processing circuitry 130, and/or to elect whether to connect display elements in series or parallel (or to treat them individually) for charge sharing as discussed above.

Figure 19:
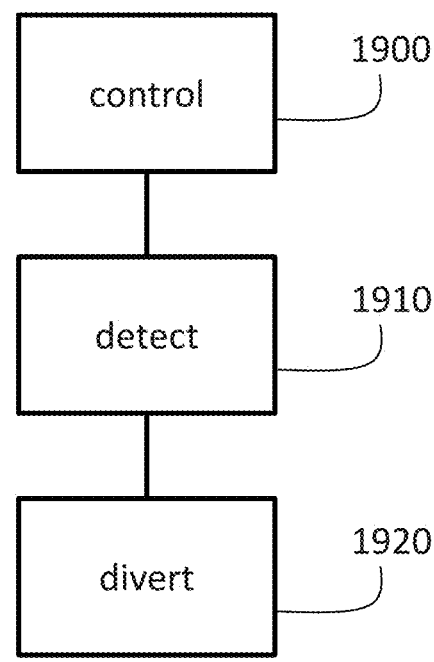

FIG. 19 is a schematically flowchart illustrating a method comprising:

controlling (at a step 1900) display of a prevailing display image by display elements of a display device, by generating a signal providing electrical charge for storage by display elements, in which an electrical charge stored by a display element controls a display output of that display element;

detecting (at a step 1910), for a given display image transition from a current display image to a second, different, display image, a first set of one or more display elements which are in a respective first state controlled by a first stored electrical charge in the current display image and which are required to be in a respective second state controlled by a second stored electrical charge, lower than the first stored electrical charge, in the second display image; and diverting (at a step 1920), in response to the detection, electrical charge from display elements of the set of one or more display elements to a secondary charge store in response to initiation of the display image transition.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. Circuitry comprising:

driver circuitry to control display of a prevailing display image by display elements of a display device, the driver circuitry generating a signal providing electrical charge for storage by display elements, in which an electrical charge stored by a display element controls a display output of that display element;

detector circuitry to detect, for a given display image transition from a current display image to a second, different, display image, a first set of one or more display elements which are in a respective first state controlled by a first stored electrical charge in the current display image and which are required to be in a respective second state controlled by a second stored electrical charge, lower than the first stored electrical charge, in the second display image; and switching circuitry, responsive to the detector circuitry, to divert electrical charge from display elements of the set of one or more display elements to a secondary charge store in response to initiation of the display image transition, wherein:

the detector circuitry is configured to detect, for the given display image transition, a second set of one or more display elements which are in a respective second state controlled by a second stored electrical charge in the current display image and which are required to be in a respective first state controlled by a first stored electrical charge, greater than the second stored electrical charge, in the second display image; and the secondary charge store comprises one or more of the second set of one or more display elements.

2. The circuitry of claim 1, in which the driver circuitry is configured to generate the signal in respect of a display element to provide a required total stored electrical charge dependent upon a required display output of that display element.

3. The circuitry of claim 2, in which, for a given display element of the second set of one or more display elements, the driver circuitry is configured to generate the signal in respect of the given display element to provide the required total stored electrical charge taking into account electrical charge diverted to the given display element by the switching circuitry.

4. The circuitry of claim 1, comprising image generator circuitry to generate a display image for display by the display device.

5. The circuitry of claim 4, in which the display device comprises one or more alphanumeric character displays.

6. The circuitry of claim 5, in which the given display image transition comprises a transition from a current display of a current set of one or more alphanumeric characters to a display of a second, different, set of alphanumeric characters.

7. The circuitry of claim 6, in which the image generator circuitry is configured to generate a display image providing a representation of the second set of alphanumeric characters, the image generator circuitry selecting the representation from two or more candidate representations in response to an amount of electrical energy currently available for use by the apparatus.

8. The circuitry of claim 7, in which the image generator circuitry is configured to select the representation from the two or more candidate representations in response to a quantity of display elements in a different state as between the current display image and each of the candidate representations.

9. The circuitry of claim 8, in which the image generator circuitry is configured to select a representation from the two or more candidate representations having a lowest quantity of display elements in a different state as between the current display image and the selected representation.

10. The circuitry of claim 8, in which the image generator circuitry is configured to select a representation from the two or more candidate representations having a highest quantity of display elements in a different state as between the current display image and the selected representation.

11. The circuitry of claim 7, in which the image generator circuitry is configured to select a representation from the two or more candidate representations in dependence upon a quantity of display elements required to be in the first state in the selected representation.

12. The circuitry of claim 1, comprising charge detection circuitry to detect an amount of charge stored by a display element, the switching circuitry being configured to vary its operation in response to the detection by the charge detection circuitry.

13. The circuitry of claim 1, in which the switching circuitry is configured to selectively connect the set of one or more display elements in series or in parallel to divert electrical charge to the secondary charge store.

14. Display apparatus comprising:
the circuitry of claim 1; and
a display device.

15. The display apparatus of claim 14, comprising energy harvesting apparatus to generate electrical energy to power at least some operations of the display apparatus in response to a current configuration or motion of the display apparatus.

16. The display apparatus of claim 15, in which the energy harvesting apparatus comprises one or more selected from the list consisting of:
(i) solar generation apparatus;
(ii) apparatus to generate electrical energy in response to physical motion of the energy harvesting apparatus;
(iii) apparatus to generate electrical energy in response to a temperature of the energy harvesting apparatus;
(iv) induction apparatus to generate electrical energy in response to presence of the energy harvesting apparatus within a given electrical and/or magnetic field.

17. The display apparatus of claim 14, in which the secondary charge store comprises a charge store configured to provide electrical energy to power at least some operations of the display apparatus.

18. A method comprising:
controlling display of a prevailing display image by display elements of a display device, by generating a signal providing electrical charge for storage by display elements, in which an electrical charge stored by a display element controls a display output of that display element;
detecting, for a given display image transition from a current display image to a second, different, display image, a first set of one or more display elements which are in a respective first state controlled by a first stored electrical charge in the current display image and which are required to be in a respective second state controlled by a second stored electrical charge, lower than the first stored electrical charge, in the second display image;
diverting, in response to the detection, electrical charge from display elements of the set of one or more display elements to a secondary charge store in response to initiation of the display image transition; and
detecting, for the given display image transition, a second set of one or more display elements which are in a respective second state controlled by a second stored electrical charge in the current display image and which are required to be in a respective first state controlled by a first stored electrical charge, greater than the second stored electrical charge, in the second display image,
wherein the secondary charge store comprises one or more of the second set of one or more display elements.

* * * * *